United States Patent
Tang et al.

(10) Patent No.: US 12,495,958 B2
(45) Date of Patent: Dec. 16, 2025

(54) MULTI-DIRECTIONAL IMAGE PHOTOGRAPHING APPARATUS

(71) Applicant: Changchun Tang, Jiangsu (CN)

(72) Inventors: Changchun Tang, Jiangsu (CN); Ruirui Tang, Jiangsu (CN)

(73) Assignee: Changchun Tang, Jiangsu (CN)

( * ) Notice: Subject to any disclaimer, the term of this patent is extended or adjusted under 35 U.S.C. 154(b) by 0 days.

(21) Appl. No.: 18/035,943

(22) PCT Filed: Nov. 8, 2021

(86) PCT No.: PCT/CN2021/129179
§ 371 (c)(1),
(2) Date: May 9, 2023

(87) PCT Pub. No.: WO2022/095986
PCT Pub. Date: May 12, 2022

(65) Prior Publication Data
US 2023/0404374 A1    Dec. 21, 2023

(30) Foreign Application Priority Data

Nov. 9, 2020   (CN) .......................... 202011238692.5
Nov. 9, 2020   (CN) .......................... 202022571993.1

(51) Int. Cl.
*A61B 1/00*     (2006.01)
*A61B 1/05*     (2006.01)
(Continued)

(52) U.S. Cl.
CPC ............ *A61B 1/00179* (2013.01); *A61B 1/05* (2013.01); *H04N 23/555* (2023.01); *H04N 23/90* (2023.01); *A61B 1/00009* (2013.01)

(58) Field of Classification Search
None
See application file for complete search history.

(56) References Cited

U.S. PATENT DOCUMENTS 5,643,175 A * 7/1997 Adair ................. A61B 1/00142
                                                   600/156
2009/0196476 A1* 8/2009 Inoue ....................... A61B 1/04
                                                   382/128
(Continued)

FOREIGN PATENT DOCUMENTS

CN    105338875 A    2/2016
CN    107295227 A    10/2017
(Continued)

OTHER PUBLICATIONS

International Search Report, China National Intellectual Property Administration, Jan. 28, 2022.
(Continued)

*Primary Examiner* — Hung Q Dang
(74) *Attorney, Agent, or Firm* — JEEN IP LAW, LLC

(57) ABSTRACT

The present disclosure provides a multi-directional image capturing device, which includes a transparent shell and a panoramic camera component, wherein the panoramic camera component comprises at least two camera lenses and camera modules provided at the inner end and the circumferential direction of the shell, the shell comprises a plurality of first outer surfaces, each of the camera lens is provided with a second outer surface, and any of the second outer surfaces corresponds to the first outer surface. According to the present disclosure, the panoramic shooting technology is used for shooting. The image of the first outer surface at the end and the circumferential direction of the shell is captured in multiple directions through a plurality of camera lenses, and then a complete panoramic picture is provided for users through edge splicing of a plurality of pictures.

11 Claims, 1 Drawing Sheet

(51) Int. Cl.
*A61B 1/06* (2006.01)
*A61B 1/303* (2006.01)
*H04N 23/50* (2023.01)
*H04N 23/90* (2023.01)

(56) References Cited

U.S. PATENT DOCUMENTS

| | | | | |
|---|---|---|---|---|
| 2009/0306477 | A1* | 12/2009 | Togino | G02B 13/06 |
| | | | | 600/176 |
| 2011/0286112 | A1* | 11/2011 | Orihara | G02B 13/18 |
| | | | | 359/716 |
| 2014/0184770 | A1 | 7/2014 | King et al. | |
| 2015/0208900 | A1* | 7/2015 | Vidas | A61B 1/00177 |
| | | | | 348/74 |
| 2017/0332890 | A1* | 11/2017 | Morita | G02B 23/26 |
| 2018/0085601 | A1* | 3/2018 | Nguyen | A61N 5/1049 |
| 2023/0284878 | A1* | 9/2023 | Salman | A61B 1/00177 |

FOREIGN PATENT DOCUMENTS

| | | | | |
|---|---|---|---|---|
| CN | 110891471 | A * | 3/2020 | ......... A61B 1/00096 |
| DE | 103323216 | B3 | 12/2004 | |
| TW | M535060 | U * | 1/2017 | |
| WO | WO-2008082005 | A1 * | 7/2008 | ......... A61B 1/00158 |

OTHER PUBLICATIONS

International Preliminary Report on Patentability, China National Intellectual Property Administration, Oct. 14, 2022.

* cited by examiner

MULTI-DIRECTIONAL IMAGE PHOTOGRAPHING APPARATUS

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/CN2021/129179 filed on Nov. 8, 2021, and which in turn claims priority under 35 USC 119 to Chinese Patent Application No. 202011238692.5 filed on Nov. 9, 2020 and Chinese Patent Application No. 202022571993.1 filed on Nov. 9, 2020.

TECHNICAL FIELD

The present disclosure relates to the technical field of health care, in particular to a multi-directional image capturing device.

BACKGROUND

In the prior art, due to the complexity of the tissue shapes of various parts of the human body, especially for some soft tissue organs in the human body which can contract and expand and have ends in a closed state at ordinary times, the surface of the inner side wall generally has deep wrinkles, so that it is very difficult for people to capture an image of the inner side wall of the soft tissue organ by using an image capturing device. Specifically, the organs such as the vaginal orifice of a female, the inner wall of the vagina and the cervix, the anal orifice, the inner wall of the anus, and the inner wall of the rectum near the prostate, etc., are consisted of soft tissues and are elastic, and their surfaces are uneven. The ports of these organs are closed until they are used. The inner wall of this part of the organ is usually in a state of contraction, and the surface has deep wrinkles. In use, the inner wall will be stretched and leveled, and there will be friction, which will inevitably lead to inflammation due to friction. If inflammation can be found in the early stage and treated as soon as possible, the pain caused by long-term severe inflammation can be avoided. Some sexually transmitted diseases or cancers will also leave symptoms on the surface of these soft tissues in the early stage. However, at present, people do not have appropriate tools to observe these symptoms and go to the hospital for treatment in time. Moreover, after people arrive at the hospital, medical staff can only make a diagnosis by collecting and sending secretions for examination. The examination period is long and the treatment is inconvenient.

At present, there are many commonly used image capturing devices, such as cameras, video cameras, web cameras and security monitoring devices, which can be used to capture images of various objects and display the captured images on a terminal device in an analog or digital manner. When these soft tissues need to be observed, photographed and shot, the lens needs to be in the narrow lumen of this part of the soft tissue organ. In this state, the existing technology cannot solve the focusing problem ideally, so that a clear image cannot be obtained. The reason is very simple. For example, for soft tissues with an uneven surface, in the range of micro-focus, if the part with a higher surface needs to be focused, the part with a lower surface will not be too clear, and if the part with a lower surface needs to be focused, the part with a higher surface will not be clear. The two situations cannot be achieved at the same time. Moreover, it is too difficult to focus on the connecting part between the higher surface and the lower surface.

In addition, it is reported that every year, more than 10 million women in our country want to have induced abortion, which is an artificial termination of pregnancy. Even some people have induced abortion several times a year. This practice against the laws of nature will definitely hurt women, and some women will be infertile for life. However, many abortions will lead to gynecological inflammation, such as pelvic inflammatory disease and salpingitis, which results in secondary infertility and endometrial thinning Therefore, the harm of multiple abortions is even greater. For those women who do not want to have children at present, safe contraceptive measures should be taken in sexual life to avoid harm caused by pregnancy. However, at present, many contraceptive methods have various defects. For example, the use of condoms will affect the pleasure of both men and women, so that some people are unwilling to use them. The placement of an intrauterine device in women's uterus will result in discomfort. In addition, some people want to have a healthy baby and choose the time of pregnancy and childbirth, and some people with infertility requires treatment, all of who hope to have new methods and corresponding tools to help pregnancy.

Therefore, how to use the simplest method to solve the technical problem in the prior art that it is very difficult for the image capturing device to capture images of the inner side wall of the soft tissue organ in human bodies has become an important technical problem that people in this field need to solve.

SUMMARY

The present disclosure aims to provide a multi-directional image capturing device, which solves the technical problem in the prior art that it is very difficult for the image capturing device to capture images of the inner side wall of the soft tissue organ in human bodies. Many technical effects that can be produced by the preferred technical scheme among the technical schemes provided by the present disclosure are described in detail hereinafter.

In order to achieve the above objectives, the present disclosure provides the following technical scheme.

The present disclosure provides a multi-directional image capturing device, comprising: a shell, which is made of transparent material; a panoramic camera component, which is provided at the inner side of the shell and comprises at least two camera lenses provided at the inner end and the circumferential direction of the shell and a camera module in communication with the camera lenses, wherein the shell comprises a plurality of first outer surfaces provided at the end and the circumferential direction of the shell, each of the camera lenses is provided with a second outer surface, and any of the second outer surfaces corresponds to the first outer surface.

Preferably, the shape of the second outer surface of any of the camera lenses is the same as the shape of the corresponding first outer surface of the shell, and the camera lens and the camera module are capable of capturing a clear image at any point on the corresponding first outer surface of the shell.

Preferably, the distance between the second outer surface of any of the camera lenses and the corresponding first outer surface of the shell is the same.

Preferably, the shell has a long columnar structure, and any of the adjacent surfaces of the end and the circumferential side of the shell is a smooth curved surface to be in transition connection.

Preferably, the shell has a cylindrical structure or a multi-curve columnar structure.

Preferably, one of the camera lenses and the camera module are provided at the inner end of the shell.

Preferably, one or more of the camera lenses and the camera module are provided in the inner circumferential direction of the shell, and the camera lenses and the camera module are arranged and distributed along the circumferential direction of the cross section of the shell and/or the axial direction of the shell.

Preferably, any of the capturing lenses is a lens suitable for macro shooting.

Preferably, the multi-directional image capturing device further comprises a light-emitting component for illumination, wherein the light-emitting component is provided at the side of the camera lens.

Preferably, the multi-directional image capturing device further comprises an image signal converter built in the shell and in communication with the camera module.

Compared with the prior art, the present disclosure has the following beneficial effects.

(1) In the present disclosure, the panoramic camera component is provided, the characteristic that the panoramic shooting technology is suitable for shooting in a narrow space is utilized. The image of the end and the circumferential direction of the shell is captured in multiple directions through a plurality of camera lenses, and then a complete panoramic picture is provided for users through edge splicing of a plurality of pictures. The visual field is wide, and the direct and detailed observation of the side wall of the soft tissue organ by the user is greatly facilitated. Moreover, according to the present disclosure, the shell matched with the panoramic camera component and the first outer surface thereof are provided to extend into the contraction cavity of the soft tissue organ for directly capturing images. The side wall of the soft tissue organ can be stretched, leveled or flattened, while being observed, photographed and shot. The side wall of the soft tissue organ is closely attached to the first outer surface at the outer end and the circumferential direction of the shell after being leveled, so that the image can be directly captured. The inner wall of the soft tissue organ is completely displayed in front of each camera lens, so that it is extremely convenient to capture the image. It is greatly convenient for users to observe the health degree of the inner side wall of the soft tissue organ.

(2) In the present disclosure, the shape of the second outer surface of the camera lens is the same as the shape of the first outer surface of the shell. The virtual surface is made into a solid surface of the first outer surface of the shell by using the similar surface with an equal focal length of the camera lens, so that each camera lens can focus on the inner side wall of the soft tissue organ more accurately, thereby making the panoramic image captured by the camera lens clearer.

(3) In the present disclosure, the shell has a long columnar structure, and any of the adjacent surfaces of the end and the circumferential side of the shell is a smooth curved surface to be in transition connection. The inner side wall of the soft tissue organ can be spread uniformly along the end and the circumferential direction of the shell, so that it is convenient for the shell to extend into the inner side wall for shooting in a moving and rotating manner. Moreover, the damage of the shell to the soft tissue organ in the shooting process is greatly reduced.

(4) In the present disclosure, one or at least two camera lenses are provided at the inner side of the shell along the circumferential direction of the cross section of the shell and/or the axial direction of the shell. A plurality of camera lenses can shoot at the same time when the shell extends into the soft tissue organ for shooting in a moving and rotating manner, so that the panoramic shooting visual field of the circumferential side of the shell can be wider and the image can be captured more accurately and clearly.

(5) In the present disclosure, the image signal converter is provided, so that the image obtained by the camera module can be converted into digital signals, transmitted and displayed in an external terminal device, which is associated with the camera module and the camera lens to jointly complete the work of image capturing, signal processing, conversion and transmission. In this way, users can carry out self-observation, photographing and shooting through the external terminal device (such as a smart phone), which is convenient to use.

BRIEF DESCRIPTION OF THE DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative effort.

In the figures, 1—shell; 2—camera lens; 3—camera module; 4—first outer surface; 5—second outer surface; 6—light-emitting component; 7—image signal converter.

DETAILED DESCRIPTION OF THE EMBODIMENTS

In order to make the object, technical scheme and advantages of the present disclosure clearer, the technical scheme of the present disclosure will be described in detail hereinafter. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

The present disclosure aims to provide a multi-directional image capturing device, which solves the technical problem in the prior art that it is very difficult for the image capturing device to capture images of the inner side wall of the soft tissue organ in human bodies using the simplest method.

Hereinafter, embodiments will be described with reference to the drawings. In addition, the following embodiments do not limit the present disclosure described in the claims. In addition, the entire contents of the structures shown in the following embodiments are not limited to those necessary for the scheme of the present disclosure described in the claims.

Figure 1:
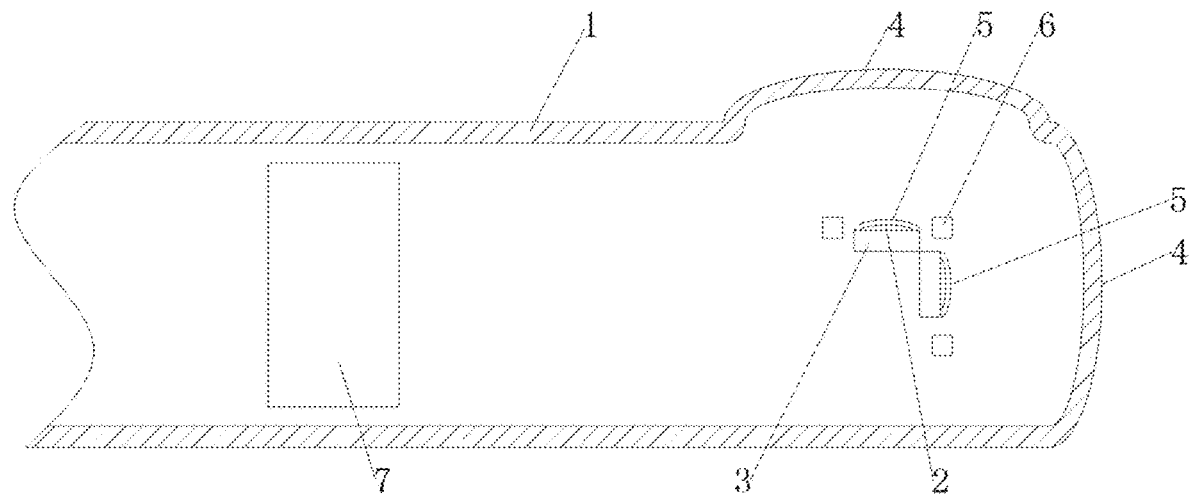
FIG. 1 is a schematic diagram of an internal structure of a multi-directional image capturing device according to an embodiment of the present disclosure.
Figure 2:
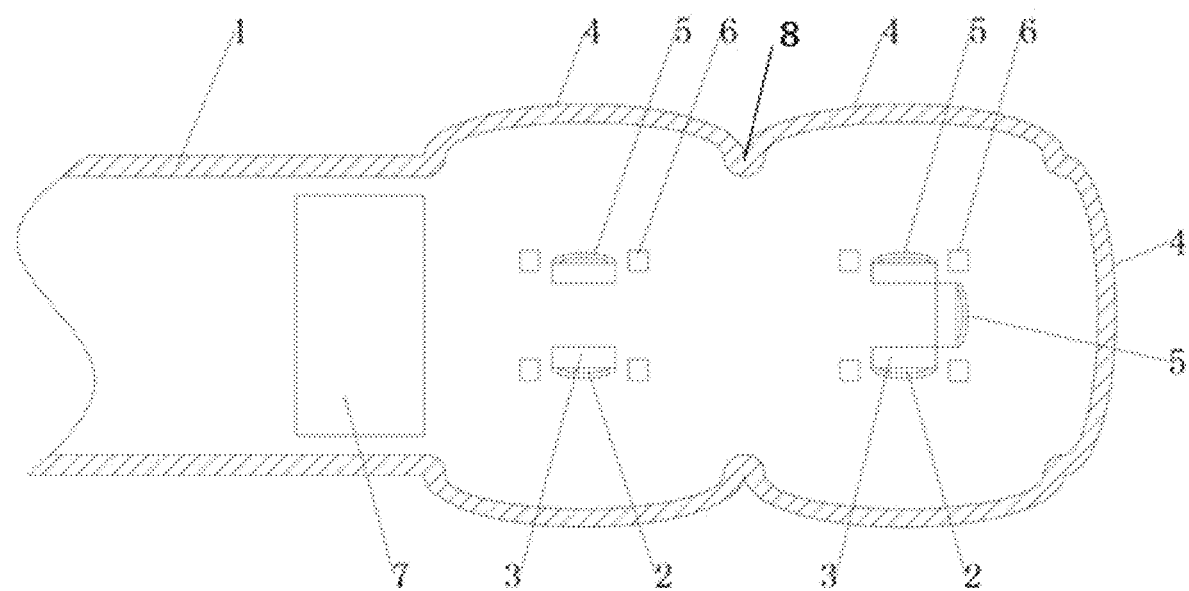
FIG. 2 is a schematic diagram of another internal structure of a multi-directional image capturing device according to an embodiment of the present disclosure.

Referring to FIGS. 1-2, the present disclosure provides a multi-directional image capturing device, which comprises a shell 1 and a panoramic camera component. The shell 1 is made of transparent material to facilitate the transmission and display of internal and external light and images. The panoramic camera component is provided at the inner side of the shell 1, and the shell 1 protects the panoramic camera component. The panoramic camera component comprises camera lenses 2 and camera modules 3 in communication with the camera lens 2, which can be, but is not limited to, electrically connected. There are at least two camera lenses 2, which are provided at the inner end and the inner circumferential direction of the shell 1, respectively. The camera module 3 is used to further perform imaging process on the image captured by the camera lens 2 and transmit the image to the outside. The shell 1 comprises a plurality of first outer surfaces 4 provided at the end and the circumferential direction of the shell. Each of the camera lenses 2 is provided with a second outer surface 5. Any of the second outer surfaces 5 corresponds to the first outer surface 4. The adjacent first outer surfaces 4 of the shell 1 can be provided in an intersecting manner, namely that each two adjacent first outer surfaces 4 of the shell 1 are intersected by forming a inflection point 8 therebetween, the first outer surface 4 constitutes an equifocal surface, which corresponds to a fixed-focal-length configuration for the camera, since each the camera lens 2 is designed as a wide-angle lens with an ultra-short focal length, the second outer surface 5 of each camera lens 2 exhibits a convex curved shape. Additionally, since the first outer surface 4 is analogous to the second outer surface 5 of the camera lens 2, it also assumes a convex curved shape, so that the multi-directional image capturing device can extend into the contraction cavity of the soft tissue organ for directly capturing images. The shell 1 is made of transparent material. Moreover, there is a certain gap distance between the first outer surface 4 of the shell 1 and the camera lens 2. The first outer surface 4 of the Shell 1 is capable of applying compressive or tensile forces to the sidewall of the soft tissue organ, thereby ensuring the soft tissue organ adequate and secure contact with the first outer surface 4. The second outer surface 5 of the camera lens 2 and the first outer surface 4 of the shell 1 ean be are provided in one-to-one correspondence, so as to directly photograph the inner wall of the soft tissue organ stretched and attached to the first outer surface 4. The soft tissue organ features inner walls characterized by deep folds. The camera lens 2 is provided at the inner end and the circumferential direction of the shell 1, so as to form a panoramic capturing layout for the end part and the circumferential direction of the shell 1. That is, the present disclosure utilizes the characteristic that the panoramic shooting technology is suitable for shooting in a narrow space. The image of the end and the circumferential direction of the first surface 4 of the shell 1 is captured in multiple directions through a plurality of camera lenses 2, and then a complete panoramic picture is provided for users through edge splicing of a plurality of pictures. The visual field is wide, and the direct and detailed observation of the side wall of the soft tissue organ by the user is greatly facilitated. According to the present disclosure, the side wall of the soft tissue organ can be compressed, stretched, leveled or flattened, while being observed, photographed and shot. The side wall of the soft tissue organ is closely attached to the first outer surface 4 at the outer end and the circumferential direction of the shell 1 after being leveled, and at this time, the image can be directly captured. The inner wall of the soft tissue organ is completely displayed in front of each camera lens 2, so that it is extremely convenient to capture the image. The user can intuitively observe whether there are symptoms on the inner wall of the soft tissue organ. Especially for contraception and pregnancy assistance, users can observe whether the uterine orifice of a female is open and a variation in color, the degree of prostate enlargement of a man, etc. According to the present disclosure, a plurality of high-pixel camera lenses 2 are directly built in all directions of the shell 1, and the inner side wall of the unfolded soft tissue organ is directly photographed and observed in a panoramic manner. The visual field is wide. The examination time period of cutting, sampling and sending the part of the soft tissue organ for examination and observation is greatly saved. The diagnosis and treatment are more convenient. The technical problem in the prior art that it is very difficult for the image capturing device to capture images of the inner side wall of the soft tissue organ features inner walls characterized by deep folds in human bodies is solved using the simplest method.

The camera module 3 (CCM) is a well-known integrated unit in this technical field, which is widely used in smart phones, security equipment and building intercom equipment. Generally speaking, the camera module 3 is consists of an infrared filter, an image sensor, a digital signal processor (DSP) and a flexible printed circuit board (FPC), which are well known to those skilled in the art. The camera lens 2 and the camera module 3 can be fixedly connected through a supporting frame or a supporting base fixedly provided in the shell 1, and users can make a choice according to their needs. With the development of the prior art, the effective pixels realized in such a manner that the camera lens 2 and the camera module 3 cooperate with each other have been increased from ordinary 48 million pixels to over 100 million pixels. It can be known that users can use the multi-directional image capturing device to enlarge the inner side wall of the soft tissue organ to capture images accurately and clearly, and do not need to diagnose the subject using the method of pinching some tissues any longer. In addition, the image data processing process of the panoramic shooting technology of unfolding and splicing the pictures of the multi-camera lens 2 into a disk-shaped or rectangular-shaped panoramic picture which is convenient for users to view is similar to that of the prior art, which will not be described in detail here. The transparent material of which the shell 1 is made is well known to those skilled in the art. For example, the material of the shell 1 can be but not limited to silicate glass, tempered glass, organic glass or polycarbonate plastic.

As an optional implementation to the embodiment of the present disclosure, the shape of any of the second outer surfaces 5 is the same as the shape of the corresponding first outer surface 4, and the camera lens 2 and the camera module 3 are capable of capturing a clear image at any point on the corresponding first outer surface 4 of the shell 1. That is, the camera lens 2 and the camera module 3 have been in focus with the shell 1 during production. It should be noted that there are infinitely many surfaces similar to the second outer surface 5 of the camera lens 2 in the outer space of the area where each camera lens 2 is located, but there is a clearest surface, that is, a similar surface with an equal focal length. According to the present disclosure, a virtual surface is made into a solid surface. The shape of the first outer surface 4 and the shape of the second outer surface 5 are the same as each other, which means that the distance between the corresponding points on the second outer surface 5 of the camera lens 2 and the first outer surface 4 of the shell 1 is the same, that is, the radians of the two outer surfaces are the same. That is, the first outer surface 4 of the shell 1 is a similar surface with an equal focal length corresponding to the camera lens 2. The camera module 3 and the camera lens 2 are designed to make the images captured in the area of the corresponding first outer surface 4 of the shell 1 the clearest. While stretching the inner side wall of the soft tissue organ, the inner side wall is further attached to the first outer surface 4, that is, the similar surface with an equal focal length of the camera lens 2. In this way, each camera lens 2 focuses on the inner side wall of the soft tissue organ more accurately, thereby making the panoramic image captured by the camera lens 2 clearer.

In addition, it should be noted that shooting is a combination of frame images, and the image quality of shooting is determined by the quality of each frame image. However, the present disclosure uses the similar plane with an equal focal length, and does not need to adjust the focal length. Each frame image is the clearest, which saves the time required for adjusting the focal length of each frame image, allows a microprocessor in a subsequent device to have more time to process image data, and acquires high-definition panoramic images faster and more efficiently. Moreover, the performance of the device according to the present disclosure can be improved with the development of the electronic device technology, such as the improvement of pixels of an image sensor, the improvement of the operation speed of a microprocessor, and the increase of the capacity of a memory.

Further, the distance between the second outer surface 5 of any of the camera lenses 2 and the corresponding first outer surface 4 of the shell 1 is the same. That is, the parameters of each camera lens 2 can be the same. The distance between the camera lens 2 and the shell 1 can be the same, and the capturing visual field of each camera lens 2 can be the same, so that the layout of the camera lens 2 is more convenient and uniform.

Further, any of the capturing lenses 2 is a lens suitable for macro shooting. The camera lens 2 can control the intensity of light reaching the photosensitive layer, the magnification of the image, the viewing angle range, the clear range of the image, etc. According to different subjects, a wide-angle lens (such as a fisheye lens) or a micro-focus lens can be used as the camera lens 2 of the present disclosure. Preferably, the camera lens 2 uses a micro-focus lens. Of course, for those skilled in the art, other types of lenses can also be used as the camera lens 2 of the present disclosure, as long as it can meet the shooting needs.

As an optional implementation of the embodiment of the present disclosure, the shell 1 has a long columnar structure, and any of the adjacent surfaces of the end and the circumferential side of the shell 1 is a smooth curved surface to be in transition connection. In this way, the shape of the shell 1 is matched with the contraction characteristics of the soft tissue organ. The inner side wall of the soft tissue organ can be spread uniformly along the end and the circumferential direction of the shell, so that it is convenient for the shell 1 to extend into the inner side wall for shooting in a moving and rotating manner. Moreover, any of the adjacent surfaces of the end and the circumferential side of the shell 1 is a smooth curved surface to be in transition connection, and the damage of the shell 1 to the soft tissue organ in the shooting process is greatly reduced.

Further, the shell 1 has a cylindrical structure or a multi-curve columnar structure with a regular shape, which can uniformly spread the inner side wall of the soft tissue organ. The camera lenses 2 therein can be uniformly distributed in the circumferential direction.

Further, one of the camera lenses 2 and the camera module 3 can be provided at the inner end of the shell 1, so that the corresponding first outer surface 4 of the shell 1 can completely cover the entire end of the shell 1, which is convenient for processing and shooting. A camera lens 2 and a camera module 3 can be provided at both the front end and the rear end of the inner side of the shell 1. Preferably, the camera lens 2 is provided at least at the front end of the inner side of the shell 1. Of course, those skilled in the art can also provide a plurality of camera lenses 2 at the inner end of the shell 1 as required, so that a plurality of lenses captures images simultaneously and the images are clearer.

Further, one or more of the camera lenses 2 and the camera module 3 are provided in the inner circumferential direction of the shell 1, and the camera lenses and the camera module are arranged and distributed along the circumferential direction of the cross section of the shell 1 and/or the axial direction of the shell 1. That is, a plurality of camera lenses 2 can be uniformly arranged and distributed in a matrix form on the inner side of the shell 1. In this way, a plurality of camera lenses 2 can shoot at the same time when the shell 1 extends into the soft tissue organ for shooting in a moving and rotating manner, so that the panoramic shooting visual field of the circumferential side of the shell can be wider and the image can be captured more accurately and clearly. FIG. 1 shows a structure in which one of the camera lenses 2 and the camera module 3 are provided in the inner circumferential direction of the shell 1, and FIG. 2 shows a structure in which a plurality of camera lenses 2 and camera modules 3 are provided in the inner circumferential direction of the shell 1.

As an optional implementation of the embodiment of the present disclosure, the present disclosure further comprises a plurality of light-emitting components 6, which can be provided at the sides of each camera lens 2, respectively, so as to provide a better shooting environment for the camera lens 2. The light-emitting component 6 can be, but not limited to, a light-emitting diode, and its color temperature can be close to natural light.

As an optional implementation of the embodiment of the present disclosure, the present disclosure comprises an image signal converter 7, which can be built in the cavity of the shell 1 and in communication with the camera module 3. The image signal converter 7 can convert the image obtained by the camera module 3 into digital signals and transmit and display the signals in an external terminal device, which is associated with the camera module 3 and the camera lens 2 to jointly complete the work of image capturing, signal processing, conversion and transmission. The external terminal device in communication with the image signal converter 7 can be, but not limited to, a mobile phone, a tablet or a computer. That is, the present disclosure can cooperate with a display terminal such as a smart phone or a computer that every person has, so that users can carry out self-observation, photographing and shooting, which is convenient to use.

In the description of the present disclosure, it should be noted that unless otherwise specified, "a plurality of" means two or more. It should be noted that the orientation or position relationships indicated by the terms described herein such as "up", "down", "left", "right", "inside", "outside", "front end", "back end", "head" and "tail" are based on the orientation or position relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure. In addition, the terms such as "first", "second" and "third" are only used for the purpose of description, and cannot be understood as indicating or implying relative importance.

In the description of the present disclosure, it should also be noted that unless otherwise specified and defined expressly, the terms such as "mount", "link" and "connect" should be understood broadly, for example, it can be fixed connection, detachable connection or integral connection; or mechanical connection or electrical connection; or direct connection or indirect connection through an intermediate medium. For those skilled in the art, the specific meanings of the above terms in the present disclosure can be understood according to specific situations.

The above only describes the specific embodiments of the present disclosure, but the scope of protection of the present disclosure is not limited thereto. Any changes or substitutions conceivable to those skilled in the art within the technical scope disclosed by the present disclosure should be covered within the scope of protection of the present disclosure. Therefore, the scope of protection of the present disclosure should be based on the scope of protection of the claims.

What is claimed is:

1. A multi-directional image capturing device, comprising:
   a shell, which is transparent;
   a panoramic camera component, which is provided at the inner side of the shell and comprises at least two camera lenses provided at the inner end and the circumferential direction of the shell and a camera module in communication with the camera lenses, wherein the shell comprises a plurality of first outer surfaces provided at the end and the circumferential direction of the shell, each of the camera lenses is provided with a second outer surface, and any of the second outer surfaces corresponds to the first outer surface, wherein each the first outer surfaces of the shell is in a convex curved surface structure extending outward, each two adjacent first outer surfaces of the shell are intersected by forming an inflection point therebetween, and the first outer surfaces extend into the contraction cavity of the soft tissue organ for directly capturing images, wherein the shape of the second outer surface of any of the camera lenses is the same as the shape of the corresponding first outer surface of the shell, and the camera lens and the camera module are capable of capturing a clear image at any point on the corresponding first outer surface of the shell, the first outer surface constitutes an equifocal surface, which corresponds to a fixed-focal-length configuration for the camera, a shape of the first outer surface and a shape of the corresponding second outer surface are the same as each other, a distance between the corresponding points on the second outer surface of the camera lens and the corresponding first outer surface of the shell is same, and a radians of the of the first outer surface is same to that of the corresponding second outer surface.

2. The multi-directional image capturing device according to claim 1, wherein the distance between the second outer surface of any of the camera lenses and the corresponding first outer surface of the shell is the same.

3. The multi-directional image capturing device according to claim 1, wherein the shell has a long columnar structure, and any of the adjacent surfaces of the end and the circumferential side of the shell is a smooth curved surface to be in transition connection.

4. The multi-directional image capturing device according to claim 3, wherein the shell has a cylindrical structure or a multi-curve columnar structure.

5. The multi-directional image capturing device according to claim 3, wherein one of the camera lenses and the camera module are provided at the inner end of the shell.

6. The multi-directional image capturing device according to claim 3 or 5, wherein one or more of the camera lenses and the camera module are provided in the inner circumferential direction of the shell, and the camera lenses and the camera module are arranged and distributed along the circumferential direction of the cross section of the shell and/or the axial direction of the shell.

7. The multi-directional image capturing device according to claim 1, wherein any of the capturing lenses is a lens suitable for wide-angle shooting and macro shooting.

8. The multi-directional image capturing device according to claim 1, further comprising a light-emitting component for illumination, wherein the light-emitting component is provided at the side of the camera lens.

9. The multi-directional image capturing device according to claim 1, further comprising an image signal converter built in the shell and in communication with the camera module.

10. The multi-directional image capturing device according to claim 1, wherein the first outer surface of the shell is a similar surface corresponding to the camera lens, and the first outer surface represents an equifocal surface.

11. The multi-directional image capturing device according to claim 1, wherein each the camera lens is designed as a wide-angle lens with an ultra-short focal length, the second outer surface of each camera lens exhibits a convex curved shape, and the first outer surface is analogous to the second outer surface of the camera lens.

* * * * *